Aug. 27, 1968   M. HUGENTOBLER   3,398,836
FILTER UNIT, IN PARTICULAR FOR COFFEE
Filed Oct. 23, 1965
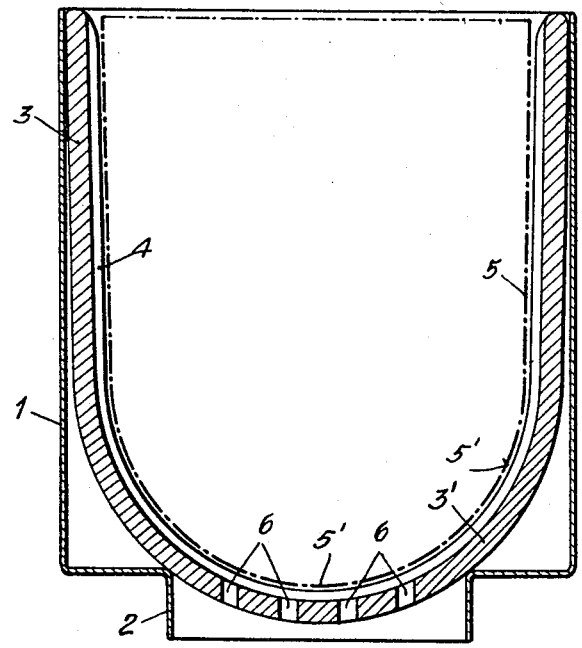
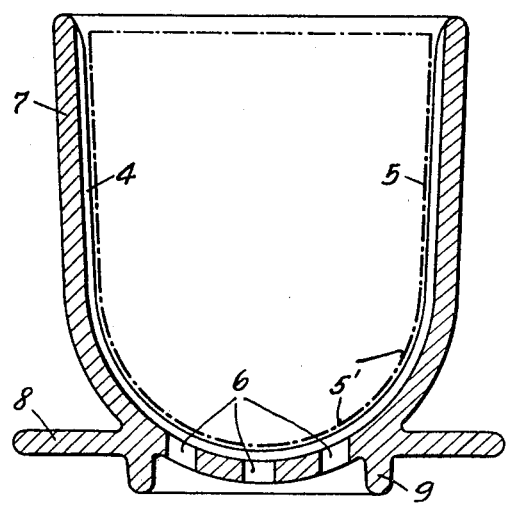
INVENTOR
MAX HUGENTOBLER
BY Lowry & Rinehart
ATTORNEYS United States Patent Office 3,398,836
Patented Aug. 27, 1968

3,398,836
FILTER UNIT, IN PARTICULAR FOR COFFEE
Max Hugentobler, 43 Schwandenwiesen,
8052 Zurich, Switzerland
Filed Oct. 23, 1965, Ser. No. 503,546
3 Claims. (Cl. 210—455)

ABSTRACT OF THE DISCLOSURE

The invention disclosed herein relates to a filter especially designed for coffee and one that can be of a size for the filter or percolating of a large quantity of coffee or one that can be of a size to be seated on the upper rim of a drinking cup and in each instance is constructed to provide means for the support thereof on a liquid-receiving receptacle.

Conventional filtering by means of pointed filter bags is tainted by the disadvantage of non-uniform use and wear of the filtering area or surface and of a non-uniform use of the filter material. Such inconvenience may be traced to the fact that hot water fed from the outside finds its way obliquely downward and outwardly already in the range of the level of the filter goods, which way obviously offers less resistance to the flow, while the water flow is checked and is slower in the interior portion in the vertical direction towards the filter tip due to the constriction. The filtering action or effect thus is different, and the aroma is not fully extracted from the filter goods.

The present invention is a filter unit, in particular for coffee, by which the above disadvantages shall be avoided. The invention is distinguished by the fact that the filter body and the filter bag that is loosely inserted in the former comprise at their lower ends a wide bottom portion which imparts a wide-faced support to the filter goods. The filtrate thus finds a substantially balanced flow resistance in the vertical direction, distributed over the entire bottom area.

Two forms of the invention are shown in the drawing, in which:

FIG. 1 is a vertical section through the filter unit for coffee machines, and

FIG. 2 is a similar section through a filter unit for private use.

The filter unit according to FIG. 1 comprises a cylindrical metallic container 1 having a downwardly projecting centering neck 2 for mounting on a coffee machine (not shown). The downwardly projecting centering neck 2 is surrounded by an annular bearing member, the latter being also a part of the container 1. The container 1 encloses a hollow filter body 3, made for example of clay or the like, of which the top portion is cylindrical and extends into a wide-face bottom portion 3' that is substantially hemispherical. The interior wall of the filter body 3 in a manner known per se, is provided with inwardly projecting ribs 4 which serve as backing for the filter bag 5 made of paper, fabric or the like. Filter bag 5 comprises also a wide-face hemispherical bottom portion 5' that is symmetrical to the bottom portion 3' of the filter body 3. The filtrate flows downwardly through the openings 6 in the filter body 3.

The second form (FIG. 2) shows a filter unit for domestic or private use. It comprises a hollow filter body 7 of which the bottom portion is provided with a downwardly projecting centering neck 9 which is surrounded by an annular bearing member 8 adapted to be put on a vessel. The interior wall of the hollow filter body 7 again is provided with inwardly projecting ribs 4 as a backing for the filter bag 5. The latter also comprises a wide-face rounded bottom portion 5', and the outflow openings of the filter body 7 are designated by 6.

The filter goods or respectively the coffee powder poured into the filter bag 5 lies in wide-face relation on the bottom so that hot water poured into same passes uniformly and vertically through the goods, finding substantially the same flow resistance, owing to the wide-face bottom portion 5', and this ensures a uniform and quick filtering action.

Such latter arrangement avoids an inward pressure on the filter goods exerted by poured-on water which pressure would favor a solidification and thus would impede a quick run-off and counteract the full aroma recovery or reclamation.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A filter unit, particularly for finely ground coffee, comprising:
  (a) a hollow filter having an impermeable, substantially uniform diameter cylindrical top portion and a permeable hemispherical bottom portion having openings located at different heights within said bottom portion;
  (b) said top portion being effectively longer than said bottom portion to provide substantial pressure in the vertical direction substantially uniformly across the entire bottom portion when liquid is introduced into said unit;
  (c) ribs projecting inwardly and over the entire inner surface of said body to support a filter bag;
  (d) a downwardly projecting centering neck; and
  (e) an annular bearing member surrounding said neck to support said unit on a vessel.

2. A filter unit according to claim 1, wherein said downwardly projecting centering neck and said annular bearing member are integral parts of a container enclosing said hollow filter body.

3. A filter unit according to claim 1, wherein said annular bearing member is formed as a flange-like peripherally projecting plate.

References Cited

UNITED STATES PATENTS 2,061,119  11/1936  Voigt _____ 210—455
2,166,980   7/1939  Welsh _____ 210—455

FOREIGN PATENTS 149,316   4/1937  Austria.
1,342,293 9/1963  France.
635,095   9/1936  Germany.

REUBEN FRIEDMAN, Primary Examiner.
J. ADEE, Assistant Examiner.